(12) United States Patent
Derin

(10) Patent No.: US 7,629,276 B2
(45) Date of Patent: Dec. 8, 2009

(54) COVERING HAVING A BURLED STRUCTURE

(75) Inventor: Martin C. Derin, Volkerode (DE)

(73) Assignee: Derin Holzapfel & Co. Grundbesitz und Beteiligungs KG, Meinhard-Frieda (DE)

( * ) Notice: Subject to any disclaimer, the term of this patent is extended or adjusted under 35 U.S.C. 154(b) by 147 days.

(21) Appl. No.: 11/542,857

(22) Filed: Oct. 4, 2006

(65) Prior Publication Data

US 2007/0087184 A1 Apr. 19, 2007

(30) Foreign Application Priority Data

Oct. 13, 2005 (DE) .................. 10 2005 049 063

(51) Int. Cl.
*B32B 5/18* (2006.01)
*B32B 5/24* (2006.01)

(52) U.S. Cl. .................. 442/30; 442/56; 428/304.4

(58) Field of Classification Search .................. 442/30, 442/56; 428/304.4
See application file for complete search history.

(56) References Cited

U.S. PATENT DOCUMENTS 5,120,587 A * 6/1992 McDermott et al. ........ 428/40.6
6,794,009 B1 * 9/2004 Brodeur et al. ............... 428/95
2002/0094404 A1 7/2002 Schottenfeld

FOREIGN PATENT DOCUMENTS

| DE | 21 34 049 A1 | 1/1973 |
| DE | 7410779 U1 | 3/1974 |
| DE | 24 40 846 C2 | 3/1976 |
| DE | 2440846 C2 | 3/1976 |
| DE | 74 10 779 | 8/1978 |
| DE | 42 14 862 A1 | 5/1993 |
| DE | 295 01 035 U1 | 5/1995 |
| DE | 19607523 | 9/1996 |
| DE | 103 25 231 A1 | 12/2004 |
| JP | 09 224807 | 9/1997 |

* cited by examiner

Primary Examiner—Norca L Torres-Velazquez
(74) Attorney, Agent, or Firm—RatnerPrestia

(57) ABSTRACT

A covering in the form of a mat or web, comprising a substrate formed as a mesh product or fabric and plastic foam enveloping the substrate which define lines of beaded caterpillar ties, extending longitudinally in a first direction, and rows of thinner connecting ties, extending longitudinally in a second direction substantially transverse to the first direction, with gaps therebetween. The caterpillar ties each comprise a constriction extending continuously along each transverse edge of the respective caterpillar tie between adjacent connecting ties over an upper or lower side of the respective caterpillar tie.

19 Claims, 4 Drawing Sheets

COVERING HAVING A BURLED STRUCTURE

This application claims priority to German Patent Appln. No. 10 2005 049 063.8 filed Oct. 13, 2005, which is incorporated in its entirety by reference herein.

BACKGROUND OF INVENTION

1. Technical Field

The invention relates to a mat-shaped or web-shaped covering for bases, in particular floors, bath and shower tubs and basins, or other foundations. It can thus also for example be a seat covering. The covering is particularly suitable for use in wet areas such as public and private baths, indoor swimming pools and sauna areas, but in principle also as a floor covering for example for factory and office buildings. In one specialised application, the covering forms a caterer's draining mat, which in the wet area of a bar can in particular serve as an underlay for rinsed or generally wet glasses or also crockery and cutlery. Such an application is of course also possible in the home. The invention relates to a covering as a finished product, in particular in the form of a mat, for example a bath or shower tube inlay, as a mat-shaped or rather web-shaped floor covering, but also as a semi-finished product, i.e. as a web product which can in particular be wound on a roller.

2. Description of the Related Art

In the private sphere, bath and shower tub inlays enjoy great popularity, since on the one hand they increase bathing or showering comfort, but on the other hand also substantially reduce the danger of slipping and thus the risk of accidents, particularly for older people and small children. Floor coverings made of plastic also significantly help to reduce the risk of accidents when laid out in passageways or at the edge of the pool in public swimming baths. The danger of slipping is caused by moisture on smooth surfaces and drastically increases when large areas of standing water are formed, i.e. when a film of water is formed. The plastic coverings employed to reduce the danger of slipping comprise perforated treading surfaces, such that a drainage effect is achieved and a closed film of water cannot form on the upper side of the respective covering. The plastic material of the covering is generally foamed in order to reduce the weight of the coverings, achieve a pleasant haptic sensation and also to increase the static friction with the base on which the plastic covering is placed. Good drainage between the upper and lower side of the covering and a sufficient grip on the base ensure safety against the covering slipping.

The plastic coverings of the Sympa-Nova® series have proven effective in practice. The Sympa-Nova® coverings consist of a plastic foam in which a substrate interlace is embedded. In accordance with the shape of the substrate interlace, the basic structure of the covering is lattice-shaped with lines of beaded caterpillar ties and rows of comparatively thinner connecting ties. Between the caterpillar ties and connecting ties, which point at right angles to each other, gaps remain through which water is drained from an upper side of the covering to the floor, to then flow away under the covering.

SUMMARY OF THE INVENTION

It is an object of the invention to provide a plastic covering which, when used in wet areas, further reduces the danger of slipping, as compared to coverings on the market.

A covering such as the invention relates to is provided as a finished product in the form of a mat or as a long, web-shaped covering, or as a semi-finished product is still a web product which needs to be fabricated further, in particular cut to length. The covering comprises a substrate formed as a mesh product or fabric and a plastic foam enveloping the substrate. The plastic foam can be enveloped by a protective lacquer in order to reduce abrasion. In preferred embodiments, the covering consists only of the substrate, the plastic foam and preferably the protective lacquer, and as applicable an overprint. The plastic foam and the embedded substrate form lines of beaded caterpillar ties and rows of connecting ties which are thinner than the caterpillar ties, said rows pointing transverse to said lines. The caterpillar ties and connecting ties form a lattice-shaped basic structure of the covering, i.e. a first-order structure. The water is drained from the upper side of the covering via the gaps remaining between the caterpillar ties and the connecting ties. In this respect, the covering in accordance with the invention can correspond in particular to the Sympa-Nova® coverings. The caterpillar ties form at least a predominant part of a bearing surface for the covering and of a treading, sitting or lying surface or standing surface for people or objects.

In accordance with the invention, however, the caterpillar ties are not simply formed as simple, substantially continuous thin beams as in the Sympa-Nova® coverings, but rather comprise a constriction between respectively adjacent connecting ties which extends continuously from both sides of the respective caterpillar tie over its upper and lower side. The caterpillar ties are partitioned in this way between each two adjacent connecting ties and acquire a burled structure comprising burls which project from their two adjacent constrictions, each raised in the manner of a plateau. The burled structure of the caterpillar ties forms a second-order structure with respect to the lattice structure cited. Water can flow off over the constrictions particularly easily. The constrictions also have a positive effect on the evaporation properties, since residual moisture still remaining in the area of the covering after water has flowed off evaporates more quickly than with the known coverings. In this respect, it is also remarkable that improved drainage and evaporation are achieved, even though in terms of its optical impression and haptic sensation, the covering in accordance with the invention is perceived less as a lattice but rather as a surface. Used for example as a draining mat in the catering sector, it provides a tilt-resistant rest for glasses placed on it. The constrictions also make it easier to cut through the product transverse to the caterpillar ties, which assists subsequent processing of the web product.

If the caterpillar ties are constricted on the upper side of the covering, this particularly reliably prevents water from being able to collect on the caterpillar ties, since such surface water flows from each individual burl into the constrictions arranged on both sides, and over the constrictions into the gaps. If the caterpillar ties are constricted on the lower side of the covering, water can also flow off transverse to the caterpillar ties to a greater extent. The constrictions can be formed only on the lower side or on both the lower side and the upper side; it has however proven completely sufficient and particularly advantageous if the caterpillar ties comprise the constrictions and the burls formed by them only on the upper side of the covering.

In addition to the covering itself, the subject of the invention also includes a method for manufacturing said covering. For said manufacture, a fabric or preferably a mesh product consisting of first threads forming lines and second threads rows is used as the substrate. The first threads and second threads are preferably meshed in their areas of intersection and particularly preferably form an interlace. The first threads are arranged in thread groups. Each of the thread groups consists of a number of first threads, for example two or three threads. The distances as measured in the transverse direction of the threads are smaller within the thread groups than from thread group to thread group. The thread groups form belt-shaped lines. Within the thread groups, the threads are preferably spaced from each other in parallel, wherein the distances between the threads of one group are smaller than the distances between the thread groups. The thread groups and the second threads form a regular pattern, preferably in a chequered form. The first and second threads can consist of a natural material, but preferably consist of a synthetic material, for example polyester. The substrate can in particular have a weight in the range of 50-80 g/m$^2$.

A paste-like plastic material is applied to the web material serving as the substrate. In particular an expanding agent, and preferably a plasticiser, are added to the plastic paste. Preferably, plasticised PVC is used. The proportion of plasticiser in the paste-like mass is between 32 and 35% by weight, i.e. very high, but on the other hand does not yet give the impression of stickiness. The proportion of plasticiser in the plastic foam of the finished covering is in the same preferred range. The proportion of PVC is preferably at least 45% by weight. The level of filler is preferably only between 10 and 16% by weight, though levels of filler up to 20% by weight also still correspond to preferred embodiments. PUR, natural rubber, synthetic rubber, PMMA, (styrene-)acrylates, unsaturated polyesters and also other pastable thermoplasts in general may be considered as plastics for the plastic foam material, as an alternative to or, as applicable, in addition to PVC.

The plastic breaks through the substrate, such that the paste-like plastic mass already envelopes the substrate at least substantially when it is applied. The paste-like plastic mass is then heated in an oven and thus foamed. Preferably, it is gelled in a preliminary stage of heating before foaming, and only then foamed at a higher temperature in a subsequent stage of heating. The foaming process is discontinued in a controlled manner by cooling. After the foaming process and hardening, the plastic foam is preferably pressurised on its upper side or lower side and thus smoothed or embossed, at any rate compressed in a thin surface layer. It can also be embossed on both sides. Thus, the covering can in particular be provided with an embossed structure on its lower side, in accordance with EP 05 000 323.5.

Manufacture is preferably performed continuously, by unwinding the substrate as a web product from a roller, guiding it via a transfer roller and, once the plastic material has been applied, conveying it continuously through an oven and foaming it in the oven. The web material which is continuously conveyed further is hardened by controlled cooling and preferably also continuously subjected to the optional smoothing or embossing process. A protective lacquer is then applied, also still continuously as is preferred. The covering material then present as a web product can be directly fabricated into a finished product or preferably wound onto a roller again as a semi-finished product, in order to be able to be fabricated further into mat-shaped or web-shaped coverings at another location. The oven for the foaming process can be formed in a number of stages, in particular in two stages, comprising an oven entry portion which is operated for gelling, as is preferred, at a lower temperature than an adjoining second oven portion which is operated at a temperature favourable for foaming.

In preferred embodiments, at most 900 g/m$^2$ of paste-like plastic is applied. On the other hand, at least 700 g of the paste-like plastic should be applied per square metre. The plastic is preferably applied evenly over the surface. The plastic mass is preferably foamed to a covering thickness of at least 5.5 mm, more preferably at least 5.8 mm. The porosity is at least predominantly a closed porosity. The composition of the paste-like plastic mass and the parameters of the foaming process are set such that the plastic foam of the finished covering preferably exhibits a density of at least 0.2 and at most 0.4 g/cm$^3$, particularly preferably 0.3±0.05 g/cm$^3$.

For the substrate, a geometry is preferred in which the second threads, which are then embedded in the connecting ties, exhibit a distance of at least 7 mm and at most 14 mm, preferably 9±2 mm, from each other in their respective pairs. The thread groups which form the framework for the caterpillar ties, one thread group for each caterpillar tie, should have a width of at least 2 mm and at most 5 mm; they preferably exhibit a width of 3±1 mm. A distance should remain between each two adjacent thread groups which measures at least 6 mm and at most 14 mm; a distance of 9±2 mm is preferred.

The burled structure in accordance with the invention has already been acquired with an even quality in prototype series, using a substrate interlace having the described geometry, by applying paste-like plasticised PVC from the range of surface coverage cited and then foaming and hardening. The burled structure materialises by itself during the foaming process. Although the burled structure is preferably formed directly by the foaming process, the possibility is not to be excluded that the burled structure is only then formed by an additional processing step, for example an embossing step. The embossing step, described above as being optional, could involve embossing the burled structure, i.e. in such a variant, the caterpillar ties with the burled structure and the individual burls of said burled structure are formed on their surface with another, finer embossing pattern. In another variant, the second-order burls and the embossing pattern would be formed in separate embossing steps.

Advantageous features are also described in the detailed description of the preferred embodiments of the invention below.

At least one example embodiment of the invention is described below. Features disclosed by the example embodiments, each individually and in any combination of features, advantageously develop the subjects of the present invention.

DETAILED DESCRIPTION OF THE PREFERRED EMBODIMENTS

Figure 1:
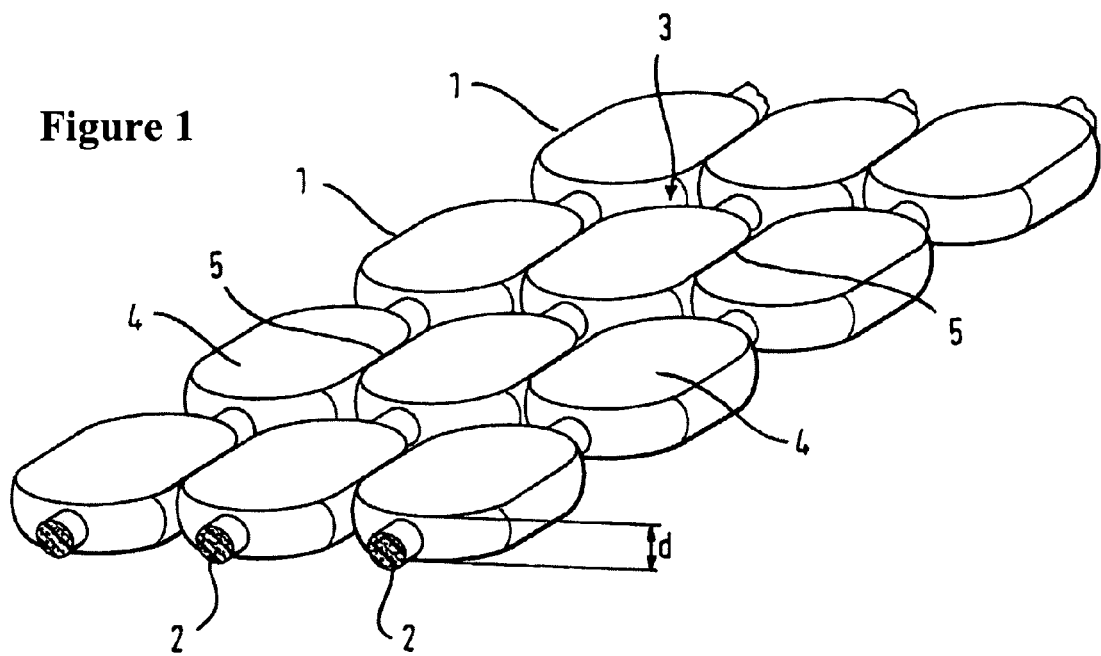
FIG. 1 is a perspective view of a covering in accordance with a first embodiment of the invention.

FIG. 1 shows a perspective view of a piece of a covering, for example a bath or shower tube inlay. The covering has a lattice-shaped structure and consists of beaded ties 1 arranged side by side in parallel, referred to in the following as caterpillar ties 1, and ties 2 pointing transversely with respect to the caterpillar ties 1, also spaced from each other in parallel, which connect the caterpillar ties 1 to each other and are therefore referred to in the following as connecting ties 2. Between the lines of caterpillar ties 1 and the rows of connecting ties 2 pointing at right angles to them, gaps 3 remain through which water can flow away from the upper side of the covering shown to its lower side, and onto the base forming the support for the covering, for example the bath tub or shower tub.

The covering is a composite body and consists completely of plastic. A substrate interlace of polyester threads forms a framework of the covering. The substrate interlace is embedded in an enveloping plastic foam, in the example embodiment plasticised PVC. The plastic foam is foamed to a thickness d of at least 6 mm, in the example embodiment 6.2 mm, wherein the thickness d is measured as the thickness of the caterpillar ties 1 when non-deformed.

Figure 2:
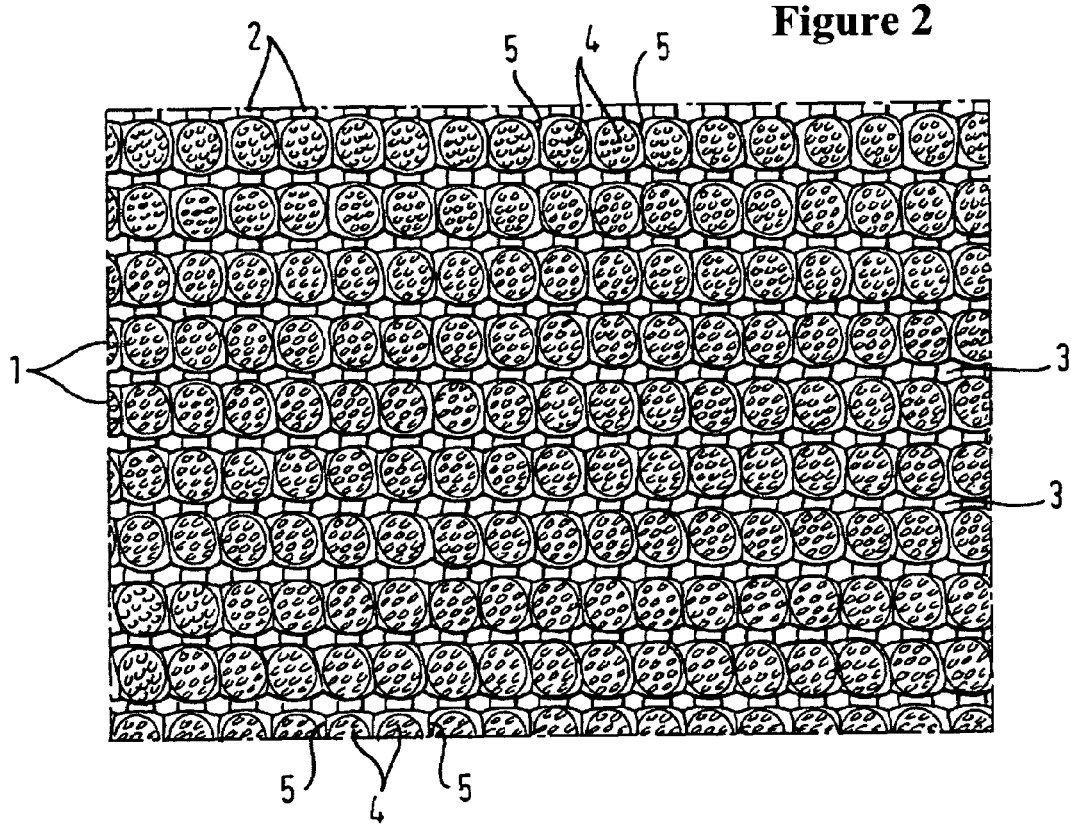
FIG. 2 is a top plan view of the covering of FIG. 1.
Figure 3:
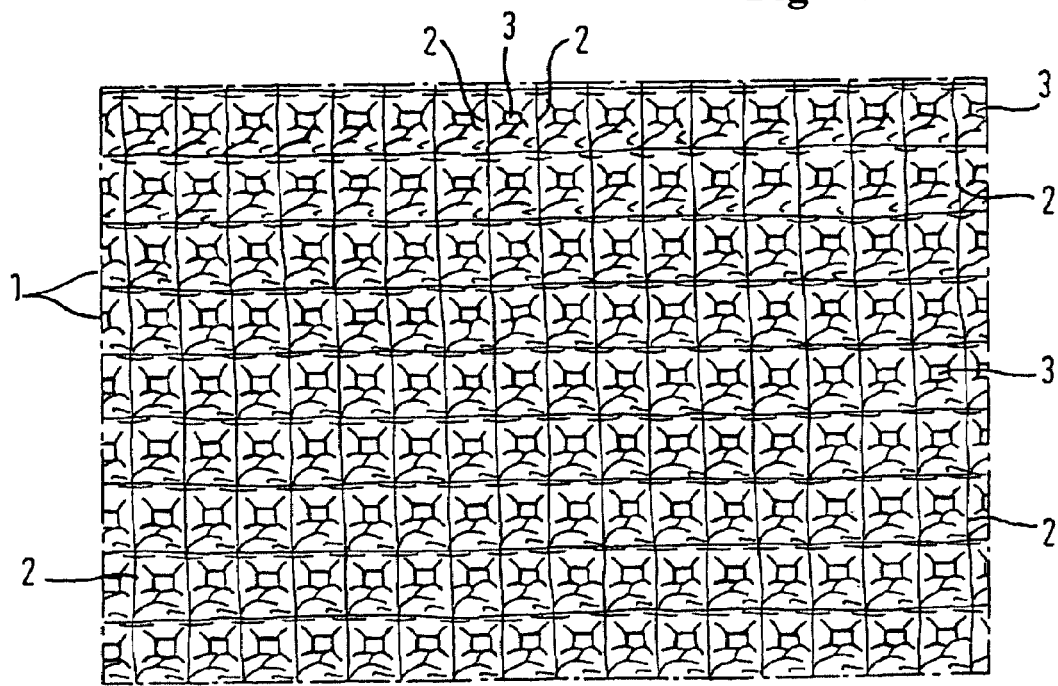
FIG. 3 is a bottom plan view of the covering of FIG. 1.

FIG. 2 shows the covering in a top view onto the upper side, and FIG. 3 shows it in a top view onto the lower side. On the upper side, the caterpillar ties 1 comprise a distinct burled structure formed from burls 4 strung together like pearls along each caterpillar tie 1, and constrictions 5 separating the burls 4 from each other. The burls 4 project, raised, from the base of the constrictions 5 separating them from each other in each case. Each burl 4 forms a plateau. In the top view, the burls 4 are oval, with a first main axis parallel to the constrictions 5 and a comparatively somewhat shorter second main axis which points in the longitudinal direction of the respective caterpillar tie 1. In the top view, the burls 4 are shaped as two circular arc portions connected to each other via the constrictions 5 on both sides of each burl 4. The constrictions 5 form the long sides of the ovals. The constrictions 5 extend over the entire upper side of the caterpillar ties 1 as well as on both sides up to or almost up to the lower side of the covering.

On each of the burls 4, a plurality of smaller burls is formed. This fine structure of smaller burls is acquired as an embossed structure by embossing. As a result, the covering comprises the lattice structure as a first-order structure which is superimposed with the burled structure consisting of the burls 4 and the constrictions 5 as a second-order structure, the burls 4 of which are in turn each further structured on the surface by a plurality of very small burls.

The lower side of the covering shown in FIG. 3 does not comprise the distinct burled structure 4, 5 of the upper side. Rather, the caterpillar ties 1 are irregularly jagged and accordingly crossed with many furrows between which plastic foam material protrudes in bulges, said material of the covering lying on the respective base area.

The connecting ties 2 are substantially circular in cross-section and thinner than the caterpillar ties 1. The connecting ties 2 meet the caterpillar ties 1 centrally between each two immediately adjacent constrictions 5. While the connecting ties 2 are thinner than the caterpillar ties 1, they are also sufficiently corpulent that the impression is created of an almost all-over covering, but with a regular pattern. On the lower side and in particular on the upper side of the covering, the connecting ties 2 recede slightly behind the caterpillar ties 1, such that the caterpillar ties 1 form both the bearing surface and the treading, sitting or lying surface of the covering. In practice, however, the connecting ties 2 can come into contact with the base area as well as with the user, due to the weight of the respective user. Not least due to the burled structure 4, 5 with its raised, projecting burls 4 and the associated reduction in the surface of the caterpillar ties 1, serving initially as a treading and sitting surface, are the latter more significantly compressed, when used at the same load, than the known Sympa-Nova® coverings.

The covering of the invention is noticeably lighter and softer as compared to the Sympa-Nova® coverings. For substantially the same proportion by area of gaps 3, the Sympa-Nova® covering has a surface density of 990 g/m² at a thickness of about 5.2 mm. The covering of the invention has a surface density of at most 950 g/m² at a thickness d of about 6.2 mm. The covering of the example embodiment even has a surface density of just 890 g/m². The degree of porosity of the plastic foam is correspondingly higher.

Figure 4:
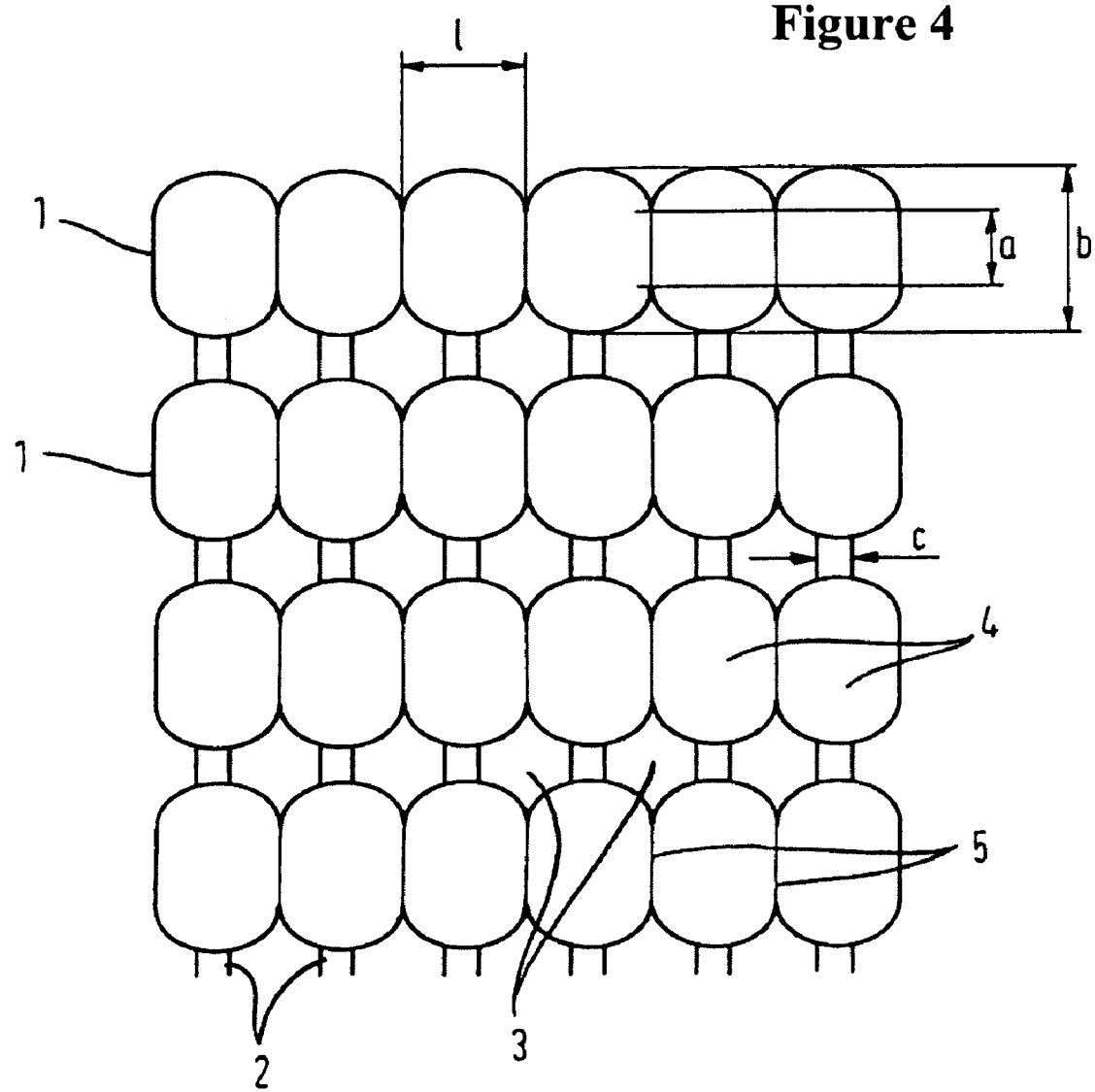
FIG. 4 is a top plan schematic representation of the covering of FIG. 1.

FIG. 4 shows a small section of the upper side of the covering in a more schematic representation which primarily serves to illustrate preferred dimensions. The length measured in the longitudinal direction of the caterpillar ties 1 is indicated by l, and two characteristic width measurements of the burls 4 are indicated by a and b. The length l is measured between each two immediately adjacent constrictions 5. The width a is the smallest width of the burls 4, i.e. the width in the area of the constrictions 5. The largest width of the burls 4 is indicated by b and occurs in the middle between each two immediately adjacent constrictions 5, where each of the two connecting ties 2 of each burl 4 bifurcate. Lastly, c indicates the thickness, i.e. the diameter, of the connecting ties 2. The length, width and thickness measurements l, a, b and c are all mean values, formed as arithmetic means over at least ten individual burls 4, constrictions 5 or connecting ties 2.

Figure 5:
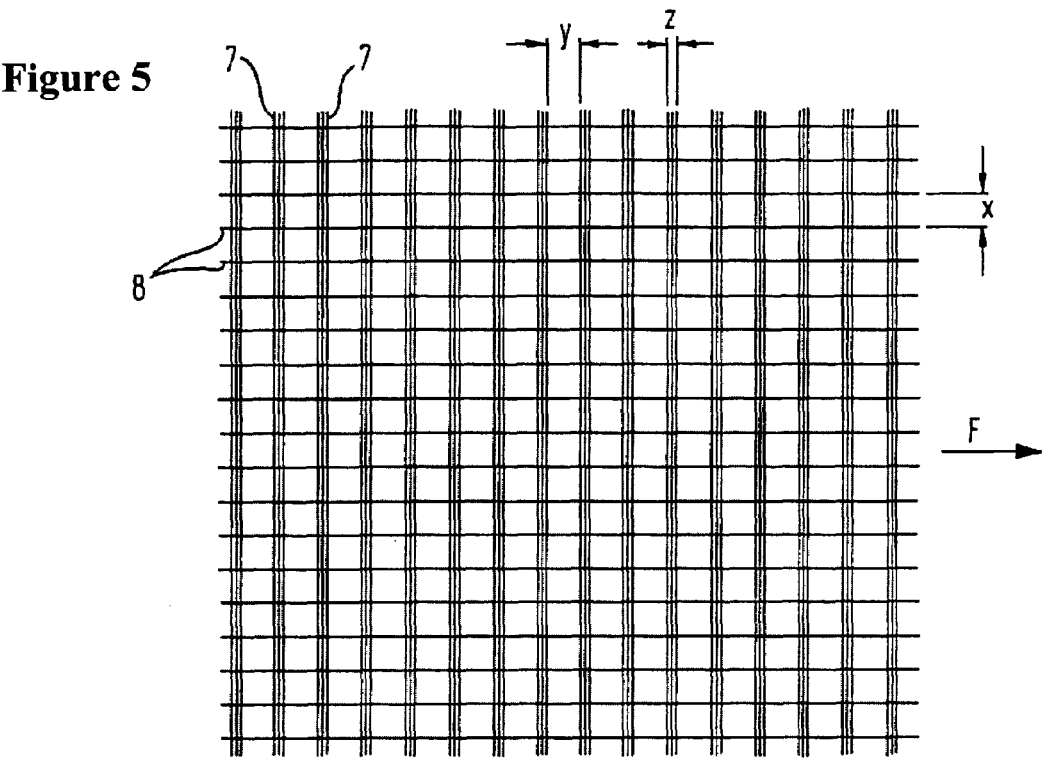
FIG. 5 is a plan view of a substrate interlace of the covering in accordance with the invention illustrated in FIG. 1.

FIG. 5 shows the embedded substrate interlace. It consists of first threads 7 and second threads 8 running at right angles to them. The threads 7 and 8 are identical. They consist of polyester. The threads 7 are arranged in lines, side by side in parallel, and the threads 8 are arranged in rows, also parallel to each other but at right angles to the threads 7. The threads 7 are meshed with the threads 8 in the areas of intersection. While the threads 8 are each arranged individually, at the same distance x from each other, the threads 7 form thread groups in which a number of threads 7 are arranged densely side by side and a comparatively larger distance y remains between each two immediately adjacent thread groups. Each of the adjacent thread groups have the same distance y from each other. Each thread group consists of three threads 7 running side by side in parallel. Each of the immediately adjacent threads 7 within the thread groups exhibit the same distance from each other, which is significantly smaller than y. The width of the thread groups is indicated by z.

The table below gives preferred minimum and maximum values, also particularly preferred ranges of values and lastly the values of the example embodiment, for the lattice 3, 4 and the substrate interlace 7, 8. While the dimensions of the covering are preferably selected such that at least the given minimum and maximum values in the combinations in the table are observed, the given ranges of values and individual values are however also advantageous outside combinations represented by the table.

| measurement | minimum | maximum | preferred | example embodiment |
| --- | --- | --- | --- | --- |
| a | 5 | 10 | 8 ± 1 | 8 |
| b | 8 | 15 | 10 ± 2 | 10 |
| c | 3 | 7 | 5 ± 1 | 5 |
| d | 5.5 | 7.5 | 6.2 ± 0.5 | 6.2 |
| l | 7 | 14 | 9 ± 2 | 9 |
| x | 7 | 14 | 9 ± 2 | 9 |
| y | 6 | 14 | 9 ± 2 | 8-9 |
| z | 2 | 5 | 3 ± 1 | 3 |

Figure 6:
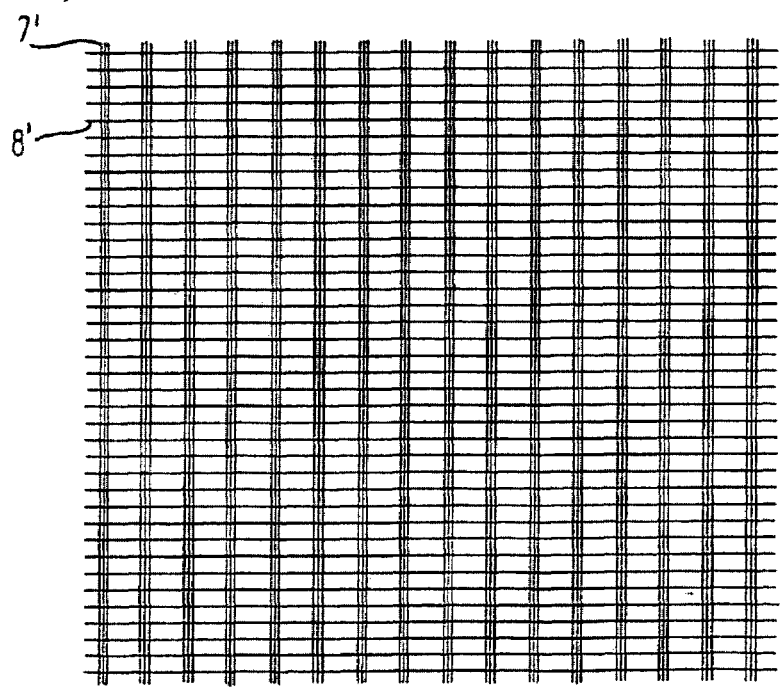
FIG. 6 is a plan view of a prior art substrate interlace.

For comparison, FIG. 6 shows the substrate interlace of the Sympa-Nova® coverings. The substrate interlace of the covering in accordance with the invention differs from the substrate interlace of the Sympa-Nova® coverings only in the distance x which the second threads 8', which cross the connecting ties 2 in the covering, exhibit from each other. In the known covering of FIG. 6, the distance x measures between 4 and 5 mm. When the distances of the second threads 8' are this small, thin beam-shaped caterpillar ties, without constrictions, form substantially continuously. It may be assumed that the plastic foam material will find support or anchoring points on the threads 8', which are comparatively narrowly spaced from each other, said points preventing constrictions having a distinct shape during foaming. In other words, the support or anchoring points are lost, so to speak, in the covering in accordance with the invention due to the larger distance x, such that the plastic foam material is constricted between two adjacent second threads 8 during foaming. Another influencing factor is the low surface coverage of the substrate interlace 7, 8.

For manufacturing the covering in accordance with the invention, the substrate interlace 7, 8 which is present as a web material is unwound from a roller and continuously guided via a transfer roller, partially winding around said transfer roller. In FIG. 5, the preferred conveying direction F is shown by an arrow. Paste-like plastic material, to which an expanding agent and a plasticiser have been added, is continuously applied by means of an applying means arranged opposite the transfer roller, and dosed by means of a blade means such that a surface coverage or surface density of at most 900 g/m$^2$, preferably 800 to 850 g/m$^2$, is set. In the example embodiment, the paste-like plastic material is applied with a surface density of 830 g/m$^2$. The paste-like plastic breaks through the substrate interlace 7, 8 to the surface of the roller and already envelopes the substrate interlace 7, 8 at least substantially immediately after being applied. The composite web consisting of the substrate interlace 7, 8 and the paste-like plastic is gelled in a gelling oven and foamed in a controlled manner in an adjoining foaming oven. The foaming oven is followed by a cooling means in which the foaming process is discontinued in a controlled manner by cooling and the plastic foam is hardened. The hardening is followed by an embossing process, also with a continuous throughput, wherein the upper side of the web is smoothed by a mechanically applied surface pressure and provided with the third-order structure consisting of the fine burls. In the final process step, a protective lacquer enveloping the entire surface of the web is applied in-line. Lastly, the web is wound onto rollers. It may also be noted that during the manufacturing process, the lower side of the web—which later also forms the lower side of the covering—contacts the circumferential surface of the transfer roller.

What is claimed:

1. A covering in the form of a mat or web, comprising:
a substrate formed as a mesh product or fabric; and
plastic foam enveloping the substrate;
wherein the plastic foam and substrate define essentially parallel lines of caterpillar ties, offset with respect to each other and extending longitudinally in a first direction, and rows of thinner connecting ties, extending longitudinally in a second direction substantially transverse to the first direction, with gaps between them;
and wherein the caterpillar ties each comprise a constriction between adjacent connecting ties which extends continuously from one lateral side to an opposite lateral side of the respective caterpillar tie over an upper or lower side of the respective caterpillar tie, thus forming beaded caterpillar ties.

2. The covering according to claim 1, wherein each caterpillar tie has a maximum transverse width "b" and a transverse width "a" measured along each constrictions; and wherein adjacent connecting ties respectively exhibit a distance "x" from each other, measured from a central axis of one connecting tie to a central axis of the other, said distance x deviating from an average width of the caterpillar ties by at most 30%, wherein the average width of the caterpillar ties is the arithmetic mean of the width a and the width b.

3. The covering according to claim 1, wherein, along the upper side of the covering, the caterpillar ties each exhibit a maximum transverse width b in the range of 8 to 15 mm.

4. The covering according to claim 1, wherein, along the upper side of the covering, the caterpillar ties exhibit a transverse width "a", measured along the constrictions, of at least 5 mm and at most 10 mm.

5. The covering according to claim 1, wherein the connecting ties exhibit a thickness "c" of at least 3 mm and at most 7 mm.

6. The covering according to a claim 1, wherein the caterpillar ties each exhibit a thickness "d", measured between the upper side and the lower side, of at least 5.5 mm and at most 7.5 mm.

7. The covering according to claim 1, wherein a burl projects from the upper side of each caterpillar tie between the constrictions such that the projected burls and constrictions alternate in sequence in the first direction.

8. The covering according to claim 7, wherein the buns are narrower in the first direction than in the second direction.

9. The covering according to claim 7, wherein the buns exhibit a length "l" from constriction to constriction, measured in the first direction, of at least 7 mm and at most 14 mm.

10. The covering according to claim 1, wherein the plastic foam exhibits an even surface density, relative to the surface of the covering, of at least 700 g/m$^2$ and at most 900 g/m$^2$.

11. The covering according to claim 1, wherein the plastic foam exhibits a density of at least 0.2 and at most 0.4 g/cm$^3$.

12. The covering according to claim 1, wherein the plastic foam exhibits a proportion of plasticiser of at least 32 and at most 35% by weight.

13. The covering according to claim 1, wherein the plastic foam contains a plastic material in a proportion of at least 40% by weight.

14. The covering according to claim 1, wherein the plastic foam contains a plastic material in a proportion of at least 45% by weight.

15. The covering according to claim 1, wherein the plastic foam contains at most 20% by weight of filler.

16. The covering according to claim 1, wherein the plastic foam contains at most 17% by weight of filler.

17. The covering according to claim 1, wherein the substrate is formed from lines of first threads which are embedded in the caterpillar ties and extend in the first direction and rows of second threads which are embedded in the connecting ties and extend in the second direction, and wherein adjacent second threads each exhibit a distance "x" from each other of at least 7 mm and at most 14 mm.

18. The covering according to claim 1, wherein the substrate is formed from lines of first threads and rows of second threads, and the first threads are arranged in thread groups, wherein the distances of adjacent threads within the thread groups are smaller than a distance "y" between the thread groups, and wherein the thread groups are embedded in the caterpillar ties and extend in the longitudinal direction of said caterpillar ties and the second threads are embedded in the connecting ties and extend in the longitudinal direction of said connecting ties.

19. The covering according to claim 18, wherein adjacent second threads exhibit a distance "x" from each other and the ratio of distance x to distance y is between 0.7 and 1.3.

* * * * *

UNITED STATES PATENT AND TRADEMARK OFFICE
CERTIFICATE OF CORRECTION

PATENT NO. : 7,629,276 B2 Page 1 of 1
APPLICATION NO. : 11/542857
DATED : December 8, 2009
INVENTOR(S) : Martin C. Derin It is certified that error appears in the above-identified patent and that said Letters Patent is hereby corrected as shown below:

At Column 8, line 22, "wherein the buns are" should read --wherein the burls are--.

At Column 8, line 24, "wherein the buns" should read --wherein the burls--.

Signed and Sealed this

Ninth Day of February, 2010

David J. Kappos
*Director of the United States Patent and Trademark Office*